Oct. 28, 1924.                                           1,513,341
                    J. F. MITSCHKA ET AL
                      AUTOMATIC GEAR SHIFT
                     Filed March 5, 1923        4 Sheets-Sheet 3
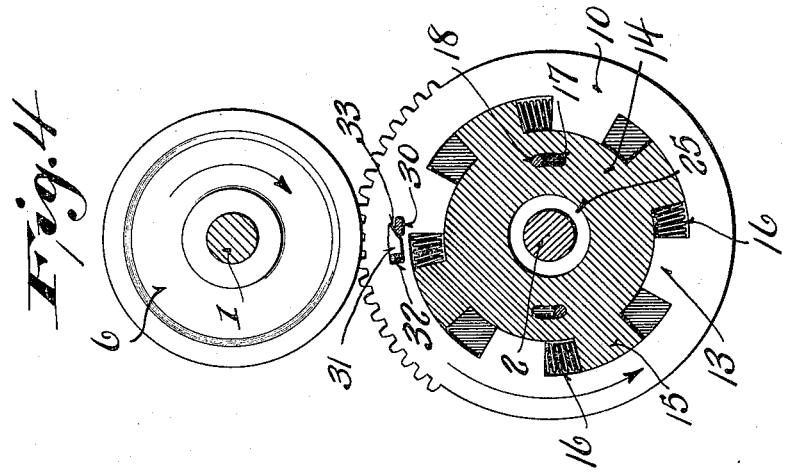
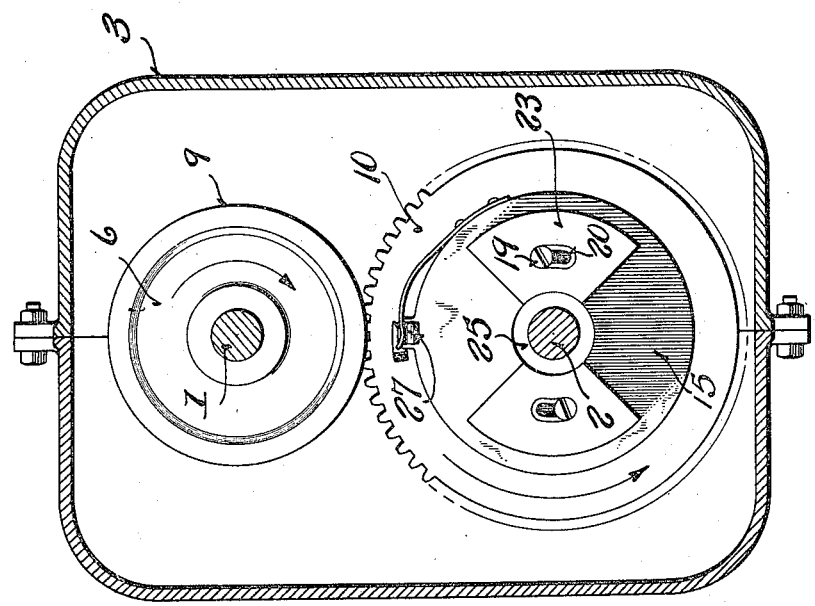

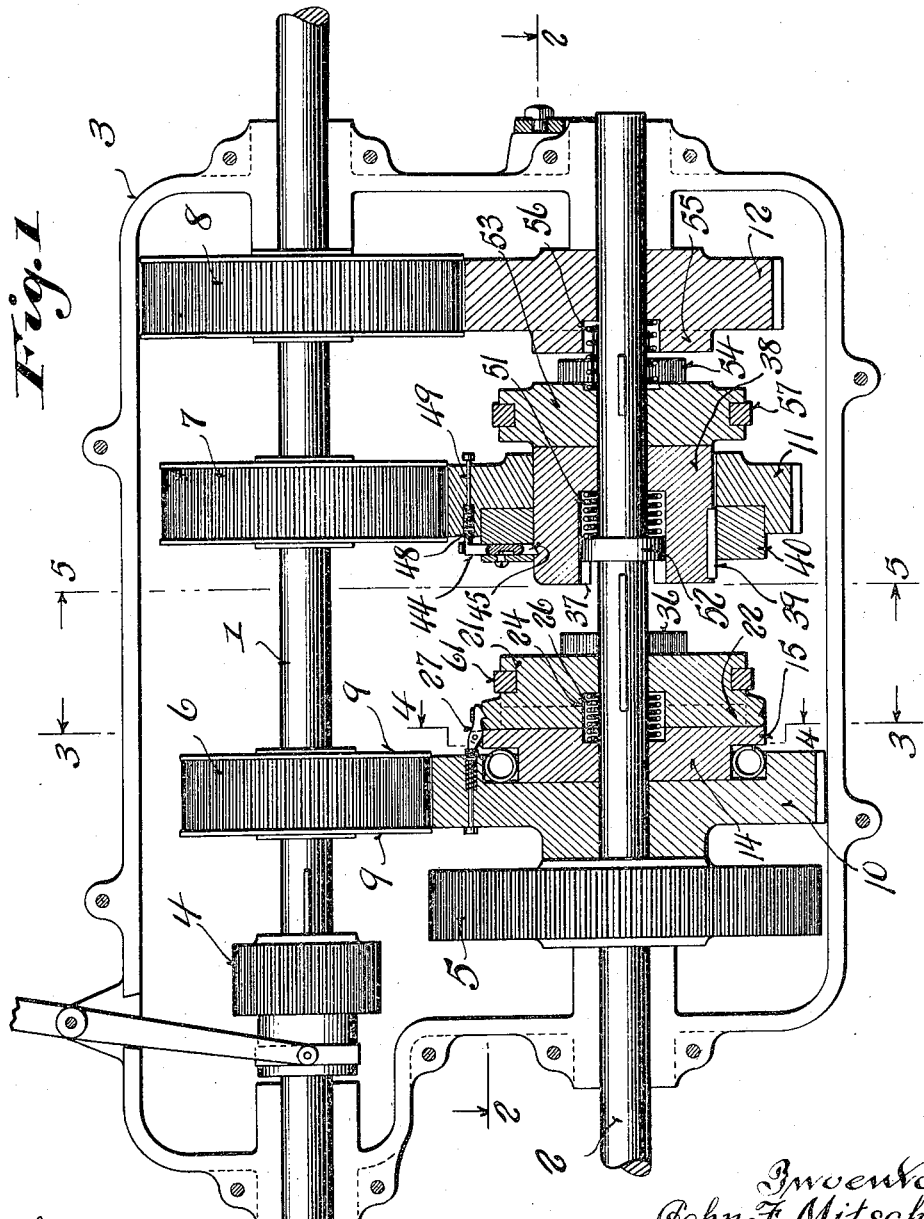

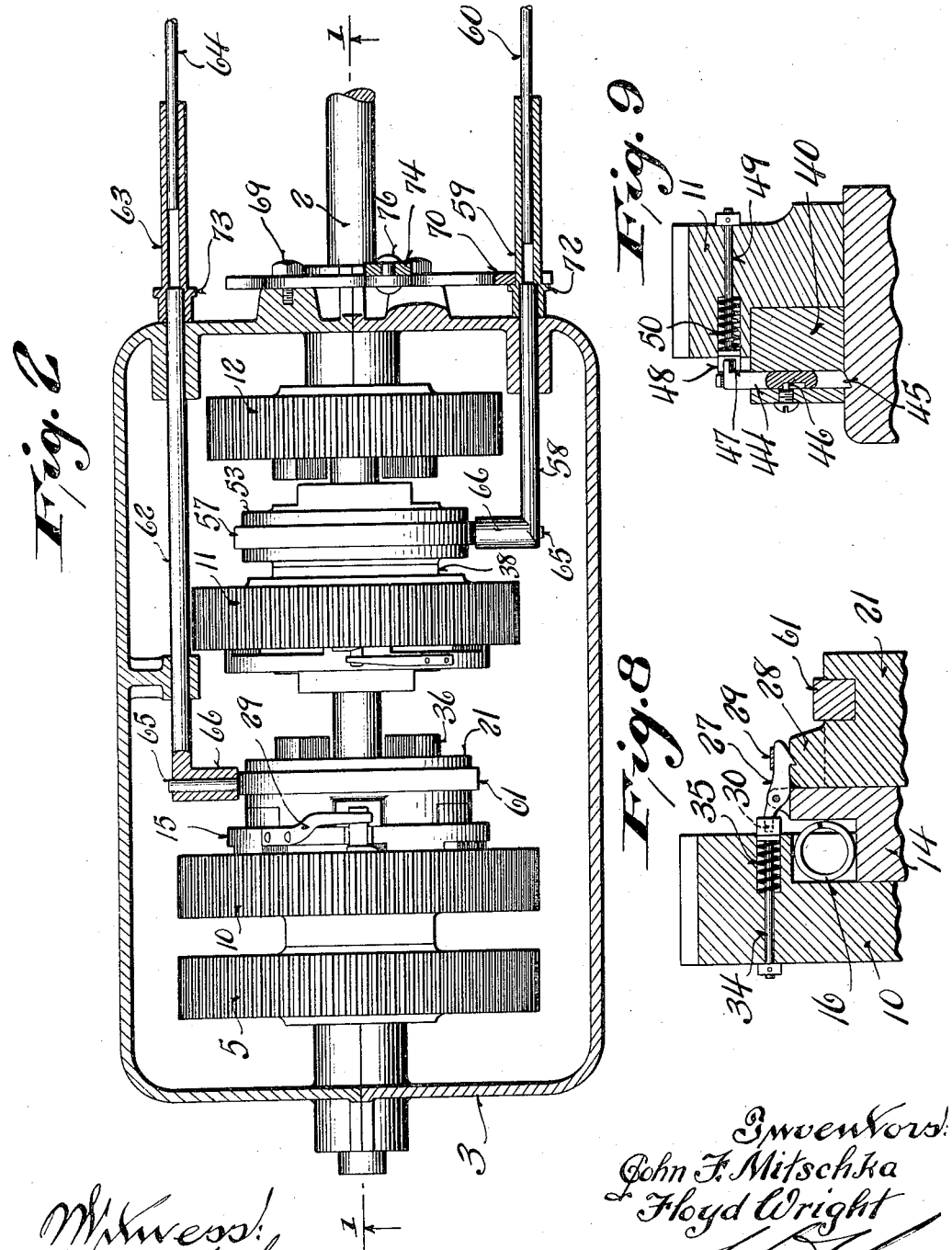

Oct. 28, 1924.  
J. F. MITSCHKA ET AL  
AUTOMATIC GEAR SHIFT  
Filed March 5, 1923  
1,513,341  
4 Sheets-Sheet 4
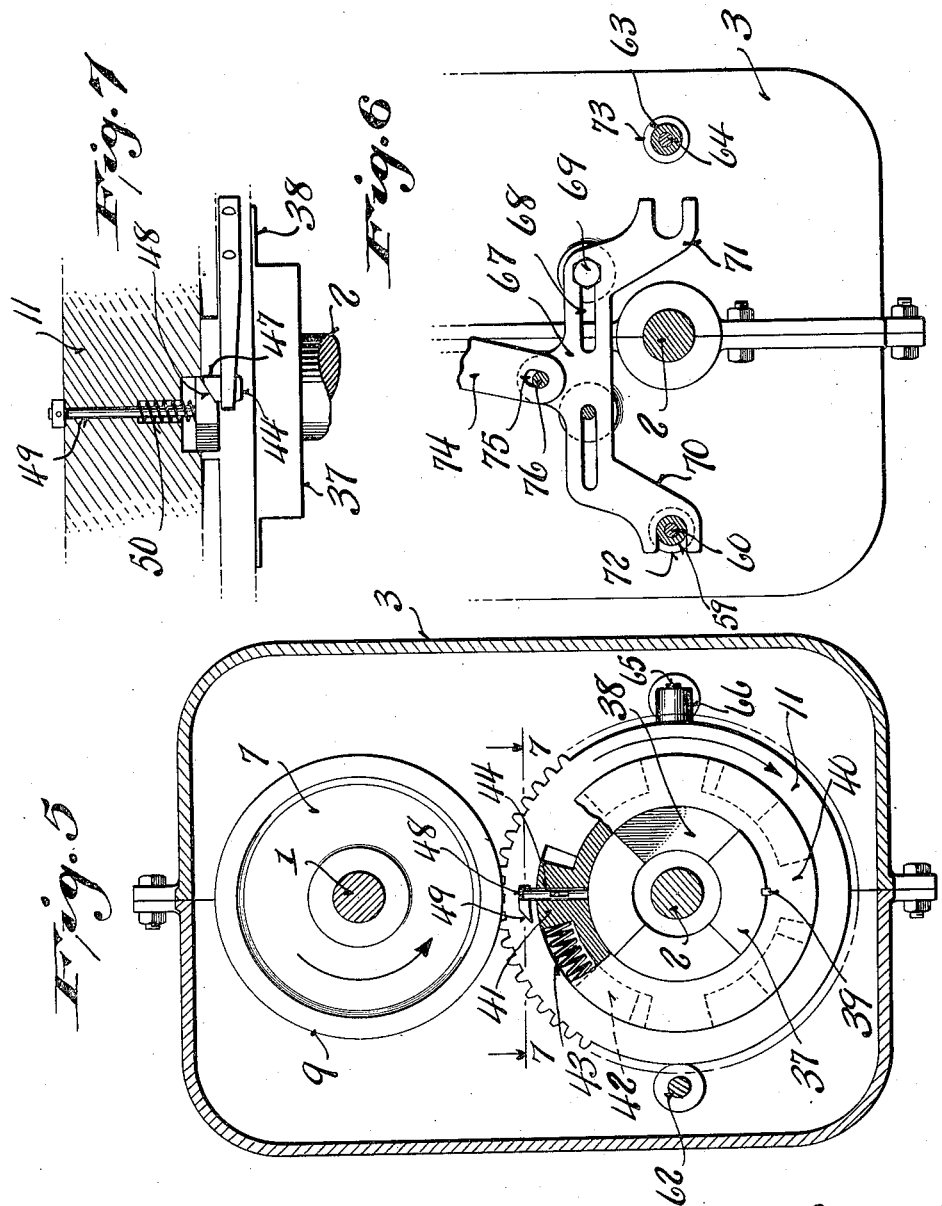

Patented Oct. 28, 1924.

1,513,341

UNITED STATES PATENT OFFICE.

JOHN F. MITSCHKA AND FLOYD WRIGHT, OF MILWAUKEE, WISCONSIN.

AUTOMATIC GEAR SHIFT.

Application filed March 5, 1923. Serial No. 622,985.

*To all whom it may concern:*

Be it known that we, JOHN F. MITSCHKA and FLOYD WRIGHT, both citizens of the United States, and residents of 323 26th Av., Milwaukee, county of Milwaukee, State of Wisconsin, have invented certain new and useful Improvements in Automatic Gear Shifts; and we do hereby declare that the following is a full, clear, and exact description thereof.

This invention relates to gear shifts and is particularly directed to gear shifts for automotive vehicles.

Objects of this invention are to provide an automatic gear shift which will provide the appropriate gear ratio between the driving and driven shaft, suited to the exact relative speeds of such shafts, which will prevent stripping of the teeth of the gears, as it connects such gears only when the conditions are correct, and to provide an automatic gear shift which will interchange the gears as the automobile speeds up.

Further objects are to provide an automatic gear shift in which the gears are automatically re-set, so that the operator may thereafter merely close the clutch, the correct gear ratios being then automatically established to provide means whereby the operation of the brake disconnects the gear train and allows a quick stop to be made and to provide mechanism whereby the clutch and brake jointly control the re-setting of the gears.

Further objects are to provide an automatic gear shift in which the high gear ratio is maintained after it has once been established, to provide a gear shift which may be locked in low gear or in intermediate gear and to provide means for maintaining the desired gear ratio in a manner which precludes its being jarred out of position when the automobile is traveling upon a rough road, for instance.

Further objects are to provide a device which is substantially fool-proof, which is of simple construction, which is efficient and avoids grinding between gears and which is of sturdy design.

An embodiment of the invention is shown in the accompanying drawings, in which—

Figure 1 is an elevation of the gear shift with a part of the casing removed and portions of the apparatus being shown in section—such view corresponding roughly to a section on the line 1—1 of Figure 2.

Figure 2 is a sectional view on the line 2—2 of Figure 1.

Figure 3 is a sectional view on the line 3—3 of Figure 1.

Figure 4 is a diagrammatic, sectional view on the line 4—4 of Figure 1.

Figure 5 is a sectional view on the line 5—5 of Figure 1.

Figure 6 is a front view of transmission, or gear shift, showing the means for locking the transmission in various positions.

Figure 7 is a fragmentary view on an enlarged scale of the releasing mechanism for the intermediate gear—such view corresponding to a section on the line 7—7 of Figure 5.

Figure 8 is a fragmentary sectional view of the releasing mechanism for the low gear.

Figure 9 is a view corresponding to Figure 8, showing the releasing mechanism illustrated in Figure 7.

Referring more particularly to the drawings, it will be seen that the device comprises a driving shaft 1 and a driven shaft 2, the driving shaft being adapted for connection with the engine shaft of an automobile by a suitable clutch (not shown in the usual manner) and the driven shaft 2 constituting the transmission shaft of the automobile. These shafts are supported by suitably bearings formed in an enclosed housing 3 and are retained in parallelism. The shaft 1 carries the usual reversing pinion 4 loosely splined thereon and suitably controlled and adapted for operative connection through an intermediate gear with the gear 5 rigidly attached to the driven shaft 2. The shaft 1 further carries a plurality of gears 6, 7 and 8 rigidly attached thereto. These gears are of progressively increasing diameter, as may be seen from Figure 1 and are each provided with projecting marginal flanges 9, upon opposite sides thereof, for the purpose hereinafter to be described. The driven shaft 2 carries a plurality of gears 10, 11 and 12, which are of progressively decreasing diameter and are in mesh with the corresponding gears 6, 7 and 8. The gears 10, 11 and 12 are loose, or free, with respect to the shaft 2 and are prevented from axial motion by means of the flanges 9, previously described.

The gears 10, 11 and 12 are adapted to be successively, operatively coupled to the driving shaft 2, so as to provide a progressively increasing gear ratio, or gear train, between the shafts 1 and 2. The means for effecting this progressive increase are dependent upon the resisting torque of the shaft 2 and function when such torque falls below a predetermined degree to thereby connect the next gear train operatively with the shaft 2 and provide a successively increased gear ratio between the shafts. The means for effecting this connection will now be described.

The gear 10 is provided with a circular recess, as may be seen from Figures 1 and 4, and has a plurality of lugs 13 projecting radially into such recess. A disc-like member 14 is provided with an outwardly projecting flange 15' and is loosely mounted upon the shaft 2. This disc-like member 14 (see Figures 1 and 4), is located within the circular recess of the gear 10 and is provided with outwardly projecting radially arranged arms, or lugs, 15, which are positioned between the lugs 13 of the gear 10. Compression springs 16 are positioned between the lugs 13 and 15 and are adapted to be compressed when the driving force is being transmitted through the gear 10—the flange 15' closing the outer portion of the recess in the gear 10 and holding the springs in position. In order to limit the extent to which the spring 16 may be compressed, a plurality of arcuate slots 17 are provided in the member 14 and cooperate with pins 18 carried by the gear 10 to limit the relative angular motion of the disc 14 and gear 10, thereby correspondingly limiting the compression of the springs 16. These pins 18 may be in the form of screws provided with flat heads 19, such heads being received in suitable recesses 20 formed in the outer face of the member 14, as may be seen from Figure 3, and thereby loosely retaining the member 14 within the recess in the gear 10.

One portion of the clutch member, as indicated at 21, is loosely splined upon the shaft 2 and is provided with projecting jaws 22 adapted to cooperate with the jaws 23 (see Figure 3), carried by the disc-like member 14 to thereby form with such member a clutch and in the position shown in Figure 1, to temporarily lock the member 14 to the shaft 2. Recesses 24 and 25 are provided in the members 21 and 14 and a helical compression spring 26 is mounted within such recesses and is spaced a material distance from the shaft 2, such spring urging the member 21 away from the member 14. A latch, in the form of a pivoted pawl 27 is carried by the member 14 and cooperates with notched lugs 28 carried by the member 21. Such pawl may be conveniently spring pressed by a leaf spring 29 (see Figures 2 and 8), carried by the member 14 and mounted upon the flange 15' of such member. This pawl is provided with a rearwardly extending arm 30, having a flat rear end. A cam member 31 is carried by the gear 10 (see Figures 4 and 8) and is provided with a tapered outer face 32 at one end and with a slanting bottom face 33 at its outer end. This cam member is carried by means of a pin 34 loosely passed through the gear 10 and is urged outwardly by means of a helical spring 35 seated within an appropriate recess in the gear 10, as shown in Figure 8.

When the parts are in the position shown in the drawings and the propelling force is being transmitted through the low gear 10, such gear moves in the direction of the arrow, Figure 4, and the flat face of the rear arm 30 of the pawl rotates upon the beveled face 33 of the cam, thereby compressing the spring 35 and freely riding over the cam, the springs 16 being correspondingly compressed by the resisting torque of the driven shaft 2, as shown in Figure 4. However, when the resisting torque of the shaft 2 has decreased to a predetermined amount, the springs 16 expand and cause the member 14 to rotate relatively to the member 10. In doing this, the end 30 of the pawl rides beneath the slanting lower face 33 of the cam (see Figure 4) and thereby disengages the pawl from the notched lug 28 of the member 21. This allows the member 21 to move axially forwardly upon the shaft 2 under the influence of the spring 26, thereby disengaging its jaws 22 from the corresponding jaws 23 of the member 14 and thus interrupting the driving connection between the low gear 10 and the shaft 2.

The condition which now obtains, is right for the connection of the driving shaft to the driven shaft through the intermediate gear 11. This is readily accomplished for, as the member 21 moves forwardly along the shaft 2, under the influence of the spring 26, its forward jaws 36 engage the corresponding jaws 37 of a hub 38, such hub being operatively connected with the gear 11. The hub 38 is, as indicated in Figure 1, loosely splined by means of the member 39 to a disc 40 mounted within a circular recess formed in the gear 11. The disk 40 is provided with a plurality of radially projecting outwardly extending lugs 41 and the gear 11 is correspondingly provided with a plurality of inwardly projecting radial lugs 42 between which are positioned a plurality of compression springs 43. This arrangement constitutes a resilient drive between the gear 11 and the member 40 and when the power is transmitted through the gear 11, the springs 43, are compressed. A pin 44 is slidably mounted within an aperture formed through one of the lugs 41 of the member 40 and is provided at its lower end with a pawl point, or tooth, 45, adapted to engage a corresponding notch formed in the member 38 and prevent axial motion of such hub relative to the gear 11. This pin 40 is held against turning in any suitable manner as, for example, by means of the pin and slot construction indicated at 46 in Figure 9. The upper end of the pin 44 is provided with a laterally extending arm 47, which, in the position shown in Figure 1, is adapted to slide over the beveled face 48 of the cam member carried by a pin 49 mounted in the gear 11. It will be seen from Figure 5 that the slanting face 48 is arranged upon the outer face of the cam member adjacent one end thereof and that the other end of the cam member is provided with a beveled surface 49 on its upper side. While the springs 44 are being compressed, the arm 47 (see Figure 9) of the pin 44 rides freely over the beveled surface 48 of the cam member, thereby forcing the cam member inwardly of the gear 11 and compressing the socketed spring 50. However, when the resisting torque of the driven shaft 2 decreases beyond a predetermined amount, the springs 43 expand and cause a relative turning motion to occur between the member 40 and the gear 11, thereby causing the arm 47 of the pin to ride over the beveled surface 49 (see Figure 5) of the cam and correspondingly elevating the pin 44. When the pin is thus elevated its pawl end is detached from the notch in the hub 38 and such hub is, therefore, free to move axially of the shaft 2.

The hub 38 is urged forwardly of the shaft by means of a helical compression spring 51 seated within an appropriate recess formed in the hub and bearing at one end against a collar 52 fixed to the shaft 2. As the hub 38 moves forwardly, it moves a member 53 forwardly along the shaft 2. This member is loosely splined to the shaft, as indicated in Figure 1 and is provided with clutch jaws 54 which, when it is moved forwardly, cooperate with corresponding jaws 55 formed upon the gear 12 thereby locking the gear 12 to the shaft 2 and thus operatively connecting the driving shaft with the driven shaft through a high gear train. It is to be noted upon reference to Figure 1 that a relatively light spring 56 is provided between the gear 12 and the clutch member 53. This spring is merely for the purpose of holding the clutch member 53 in contact with the hub 38 and is readily overcome by the spring 51.

It will be seen from the description thus far given, that when the driving shaft 1 is operated, motion is transmitted to the driven shaft 2 first through the gear train, including the low gear and thus such shaft 2 is given a relatively low rate of rotation with respect to the shaft 1. At an appropriate time, that is to say, when the resisting torque has sufficiently decreased, the next, or intermediate gear 11, is operatively connected with the shaft 2 while the gear 10 is disconnected therefrom, thus providing for an intermediate speed. In a similar manner, when the resisting torque has again decreased and the time is suitable for the next gear change, the hub 38 moves forwardly of the shaft 2, thereby disconnecting the gear 11 from such shaft and connecting the gear 12 thereto, thus coupling the driving and driven shafts through a high gear train.

Provision is made for re-setting the mechanism, that is to say, for moving it back into the position illustrated in Figure 1. This re-setting is readily accomplished by equipping the clutch member 53 with a groove within which is seated a slip ring 57, such ring being connected through the medium of a rod 58, sleeve 59 and a rod 60 with the clutch mechanism of the automobile (not shown). The sleeve 59 is readily attached to the rod 58 and has slidably socketed therein the rod 60, so that such rod 60 may move forwardly when the clutch is released, but upon its rearward motion, that is to say, upon opening of the clutch will move the rod 58 rearwardly, thereby re-setting the clutch member 53 and the hub 38. In a similar manner, the member 21 is provided with a groove within which is seated a slip ring 61 such slip ring being connected through the medium of the rod 62, sleeve 63 and rod 64 with the brake of the automobile (not shown). When the brake is free, the rod 64 freely slides within the sleeve 63. However, when the brake is applied, the rear end of the rod 64 continues with the rod 62 and forces such latter rod rearwardly, thereby moving the member 21 into the position shown in Figure 1 and completing the re-setting of the mechanism. The rods 58 and 62 may be connected in any suitable manner with their slip rings 57 and 61 respectively. A convenient means is shown in Figure 2 in which the slip rings are provided with pins 65 which are received in hubs 66 carried by the rods 58 and 62. It is also to be noted from Figure 2 that suitable guiding bearings may be formed in the casting constituting the housing 3.

It is sometimes desirable to lock the transmission or gear shift either in low or in intermediate position and to insure the retention of such gear shift in the selected position, although the automobile may be violently jolted, as when traveling over a rough road. This is readily accomplished by means of a latching slide 67 mounted upon the forward portion of the transmission or gear shift casing 3, as shown in Figures 2 and 6. This slide may be provided with a pair of slots 68 which are guided by bolts 69 passed therethrough and into appropriate bosses formed upon the forward face of the casing 3. This slide is provided with bifurcated arms 70 and 71 adapted to respectively span the sleeves 59 and 63 when it is moved in the appropriate direction. The sleeves 59 and 63 are respectively provided with flanges 72 and 73, which may be received back of the arms 70 and 71, as idicated in Figure 6. When the sleeve 59 or 63 is thus held, the gear shift is locked in intermediate or low position respectively. Any convenient means may be provided for operating the slide 67 as, for instance, a lever 74 provided with a slot 75 adjacent its lower end cooperating with a pin 76 carried by the slide 67.

It will be seen, therefore, that an automatic gear shift has been provided in which the appropriate gear of the transmission is automatically thrown into operation at the appropriate instant. It will further be seen that stripping of the gear teeth is prevented by this mechanism and that a smooth, but uniform acceleration of the automobile is secured.

It will further be seen that extremely simple means have been provided for accomplishing these results and that such means may be readily re-set by the usual operations, such as opening the clutch, or applying the brake, so that the operator is relieved of the necessity of manipulating any auxiliary devices.

It will further be seen that means have been provided whereby the shock and the stresses incident to the changing from one gear to another gear are cushioned by the compression springs provided in the corresponding gears.

It will further be seen that means have been provided whereby the transmission of gear shift may be locked in any desired position.

We claim:

1. An automatic gear shift comprising a driving shaft and a driven shaft, a plurality of gears rigidly attached to one of such shafts, a plurality of gears loosely carried by the other of such shafts and operatively connected to said first mentioned gears to provide gear trains of progressively increasing ratio, means adapted to operatively couple said last mentioned gears in succession to said driven shaft, a plurality of springs interposed between certain of said last mentioned gears and said means, and latches cooperating with said springs to successively release said means and thus secure the successive operative coupling of said second mentioned gears with the corresponding shaft.

2. An automatic gear shift comprising a driving shaft, a driven shaft, a plurality of gears of progressively increasing diameter rigidly attached to said driving shaft, a plurality of gears of progressively decreasing diameter loosely mounted upon said driven shaft, independent resilient means for said loosely mounted gears adapted to be compressed in proportion to the resisting torque of said driven shaft, and means associated with said resilient means for successively connecting said last mentioned gears and said shaft.

3. An automatic gear shift comprising a shaft, a plurality of gears loosely mounted thereon, means for rotating said gears at relatively different rates, clutches for operatively connecting said gears and shaft, resilient means tending to close said clutches, latches restraining movement of said clutches, and means responsive to the resisting torque of said shaft for tripping said latches when said torque is appropriately decreased.

4. An automatic gear shift comprising a shaft, a plurality of gears loosely mounted thereon, means for rotating said gears at relatively different rates, clutches for operatively connecting said gears and shaft, resilient means tending to close said clutches, latches restraining movement of said clutches, means responsive to the resisting torque of said shaft for tripping said latches, and means for re-setting said clutches.

In testimony that we claim the foregoing we have hereunto set our hands at Milwaukee in the county of Milwaukee and State of Wisconsin.

JOHN F. MITSCHKA.
FLOYD WRIGHT.